Nov. 23, 1954   C. R. SHORT ET AL   2,694,832
DECORTICATING MACHINE AND METHOD OF TREATING FIBER
FROM RAMIE AND SIMILAR FIBER-BEARING PLANTS
Filed Dec. 29, 1948   7 Sheets-Sheet 1
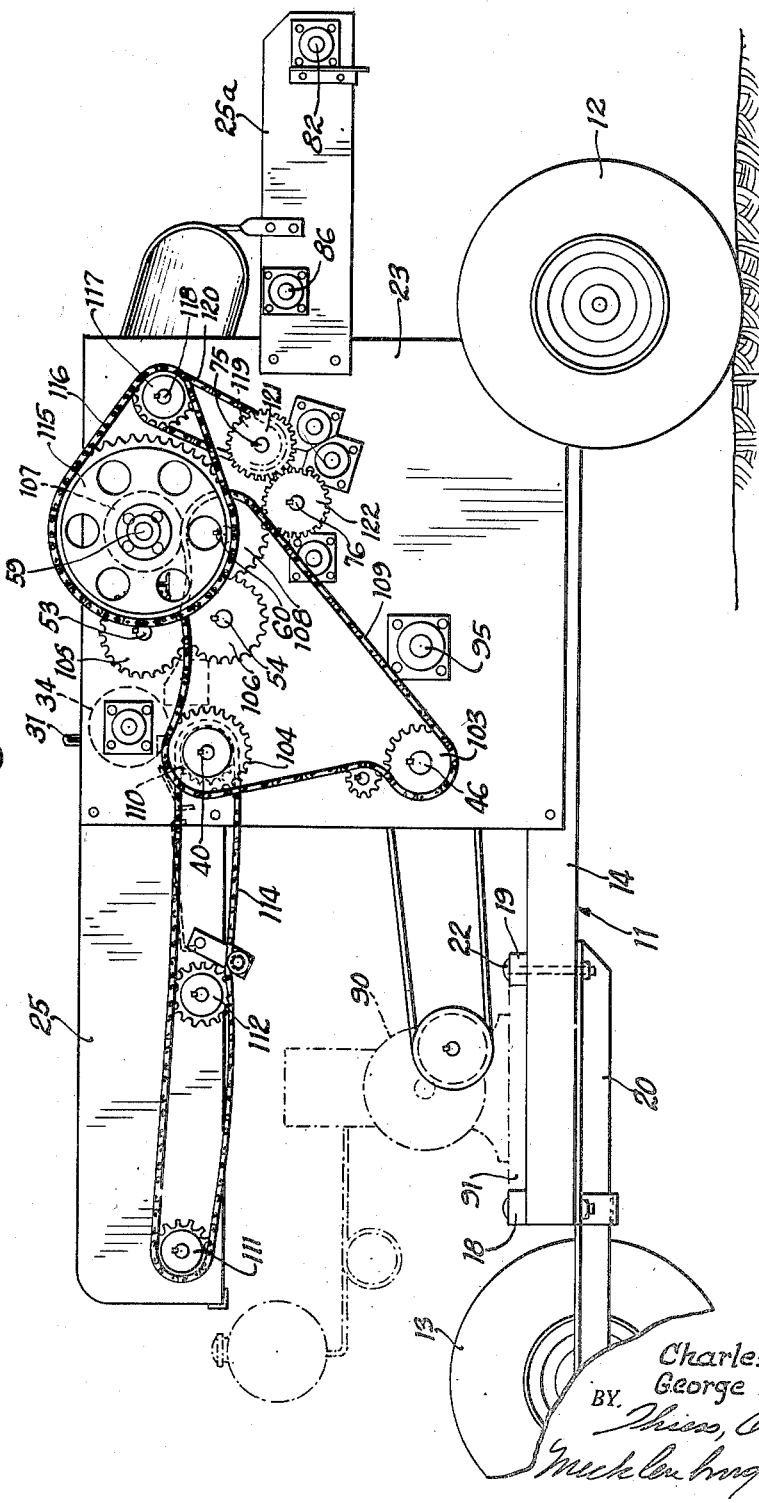
INVENTORS:
Charles R. Short
George E. Short
BY Thiess, Olson &
Mecklenburger att'ys

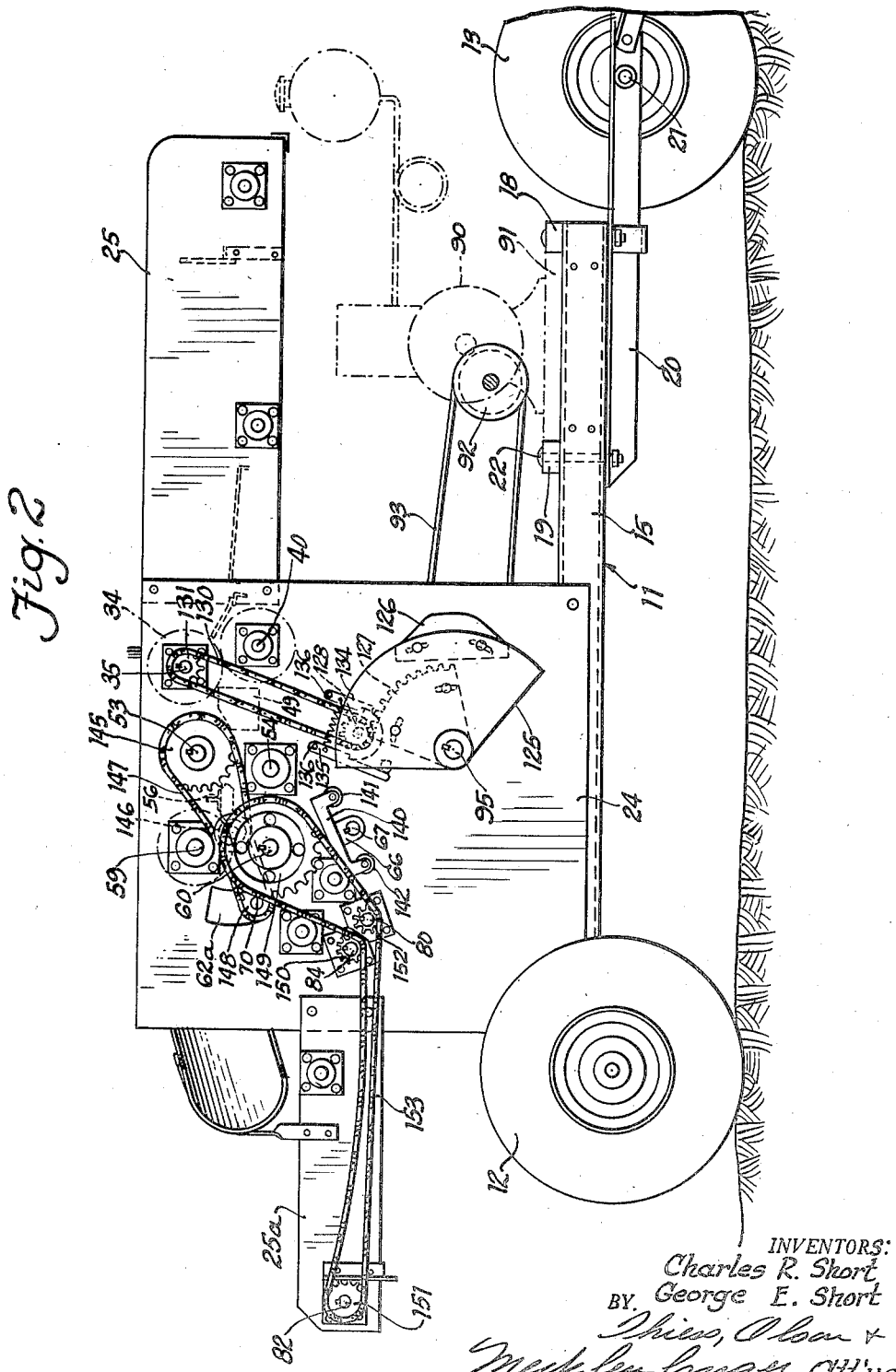

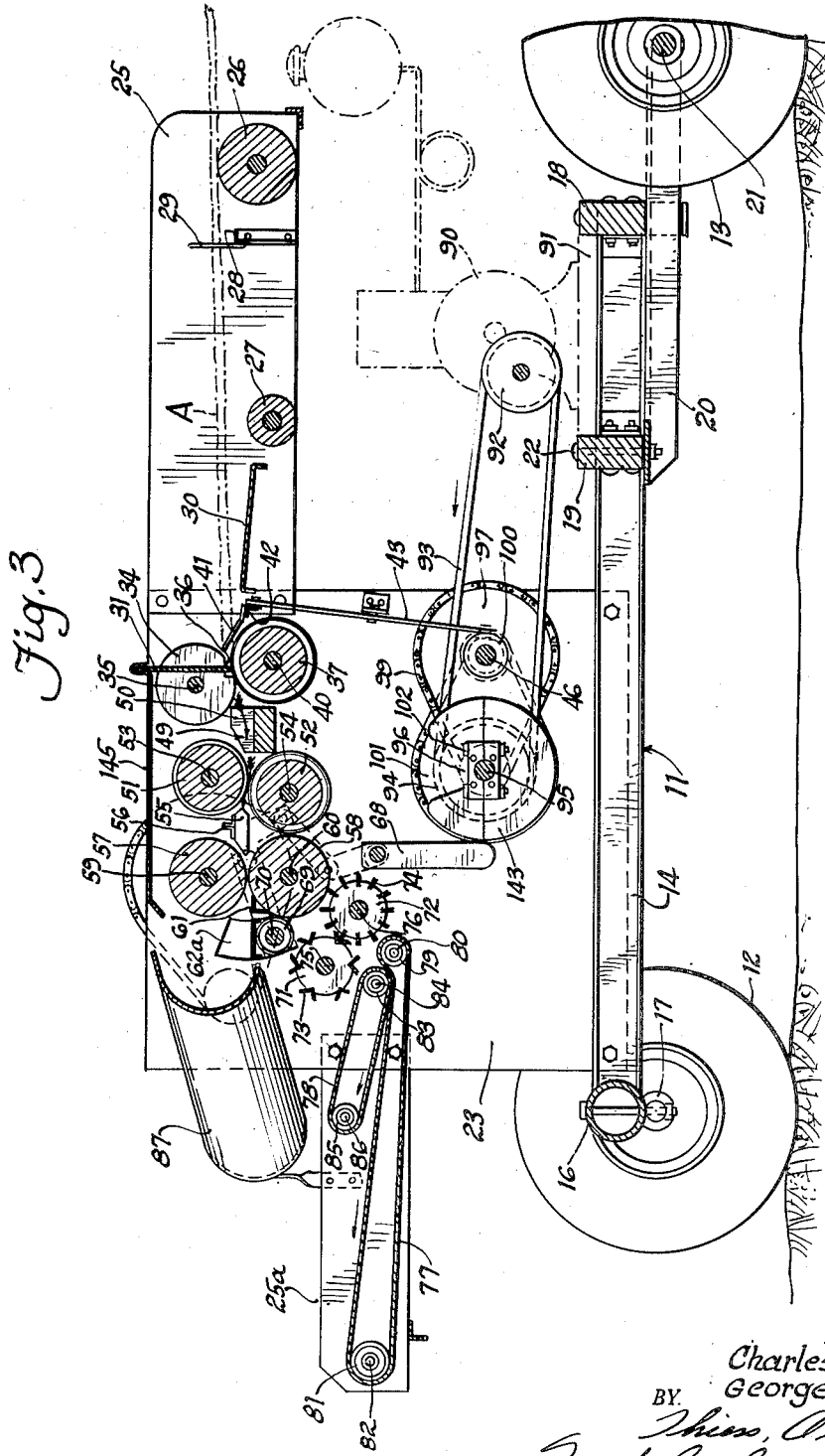

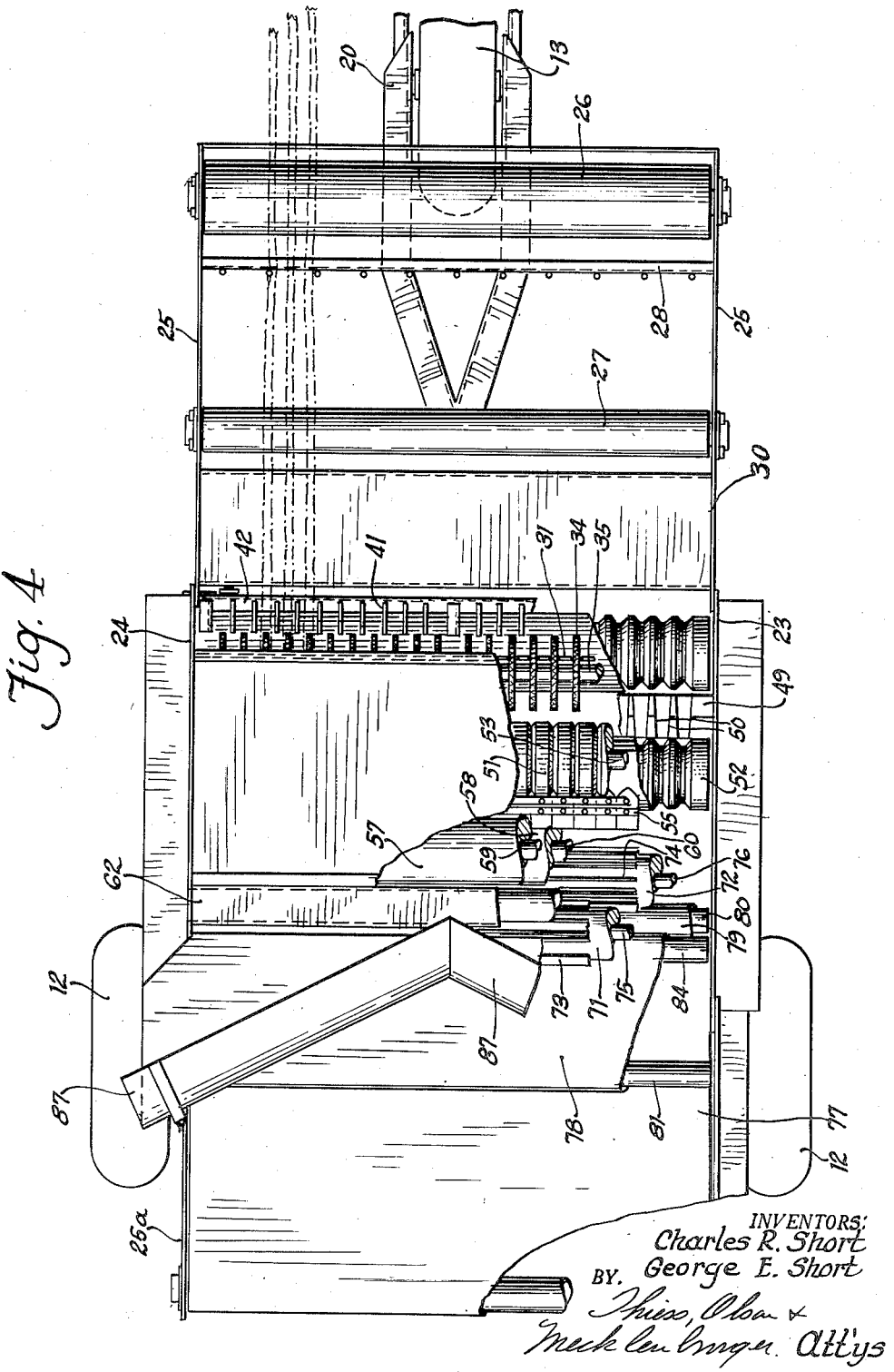

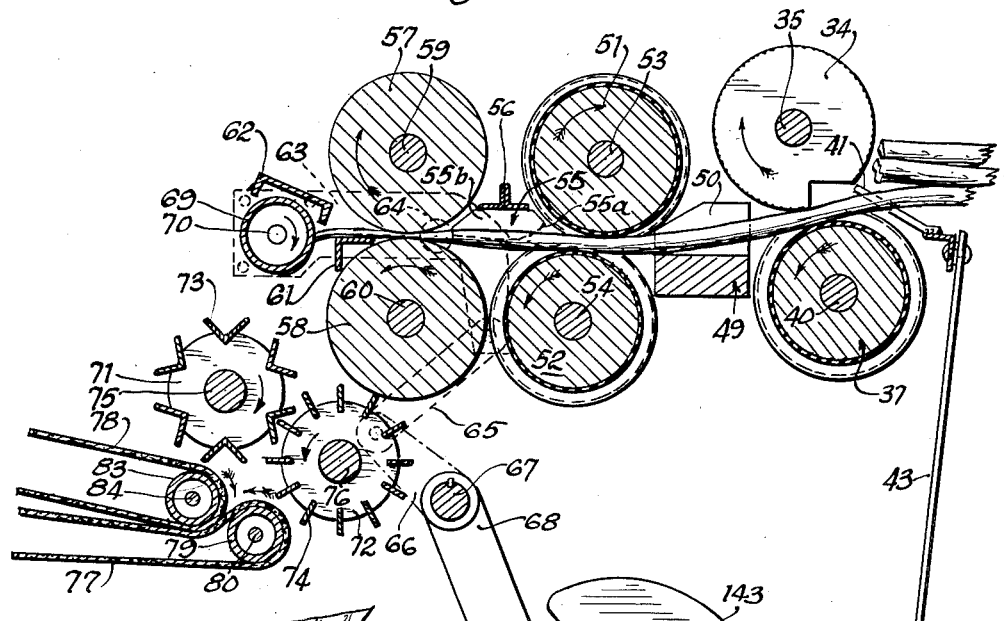
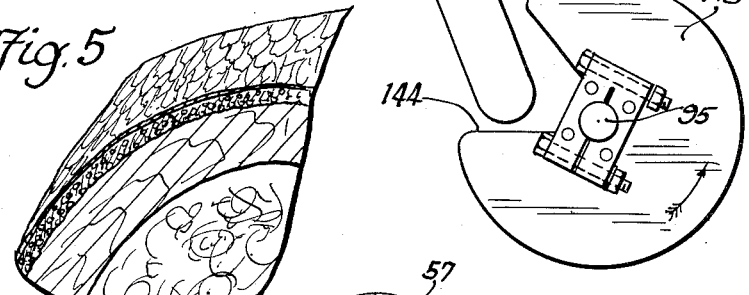
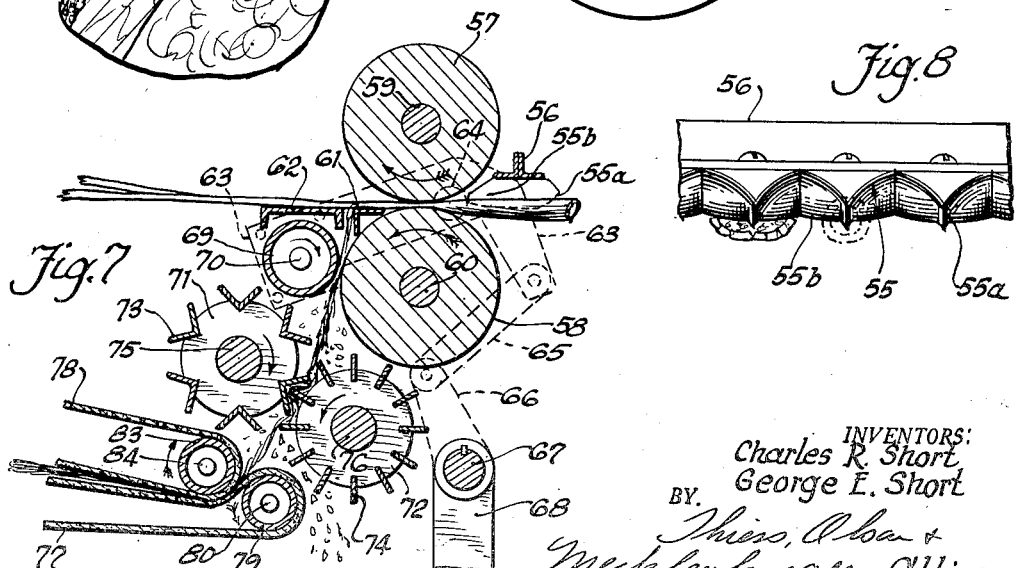

Nov. 23, 1954
C. R. SHORT ET AL
2,694,832
DECORTICATING MACHINE AND METHOD OF TREATING FIBER
FROM RAMIE AND SIMILAR FIBER-BEARING PLANTS
Filed Dec. 29, 1948
7 Sheets-Sheet 6
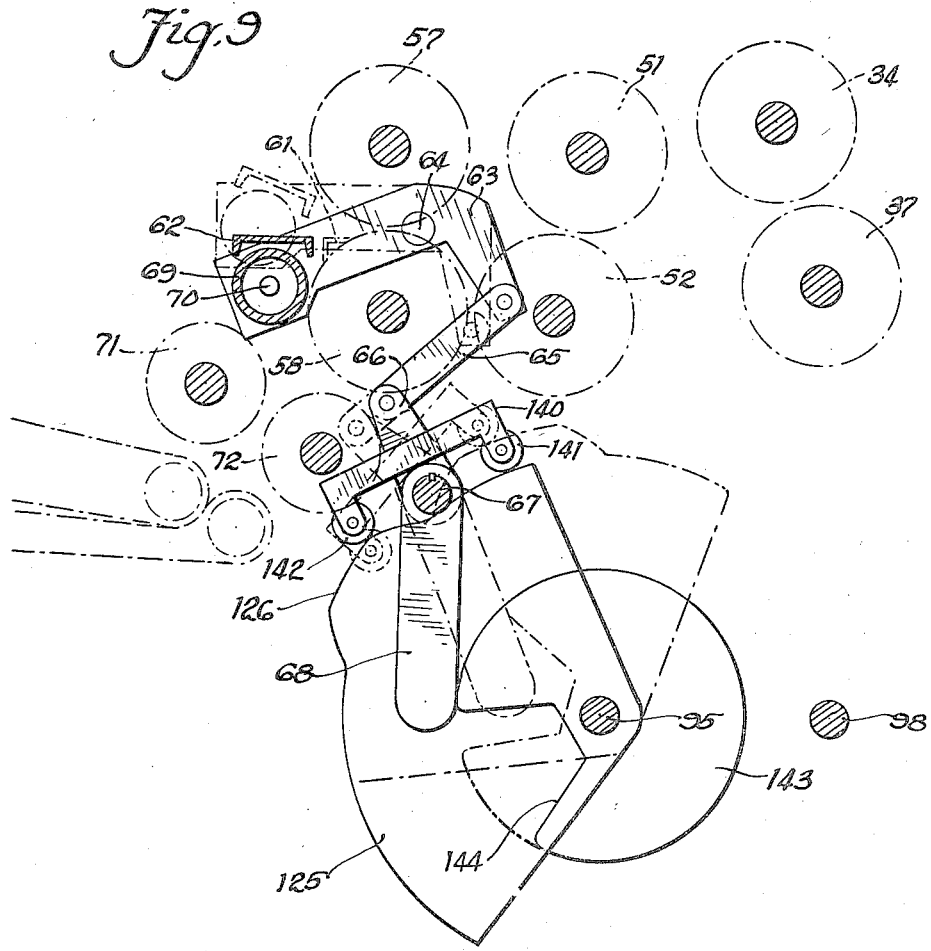
INVENTORS:
Charles R. Short
George E. Short
BY.
Attys Nov. 23, 1954　　C. R. SHORT ET AL　　2,694,832
DECORTICATING MACHINE AND METHOD OF TREATING FIBER
FROM RAMIE AND SIMILAR FIBER-BEARING PLANTS
Filed Dec. 29, 1948　　　　　　　　　　　　　7 Sheets-Sheet 7
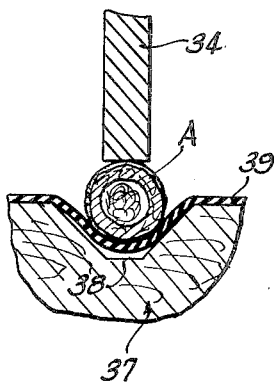
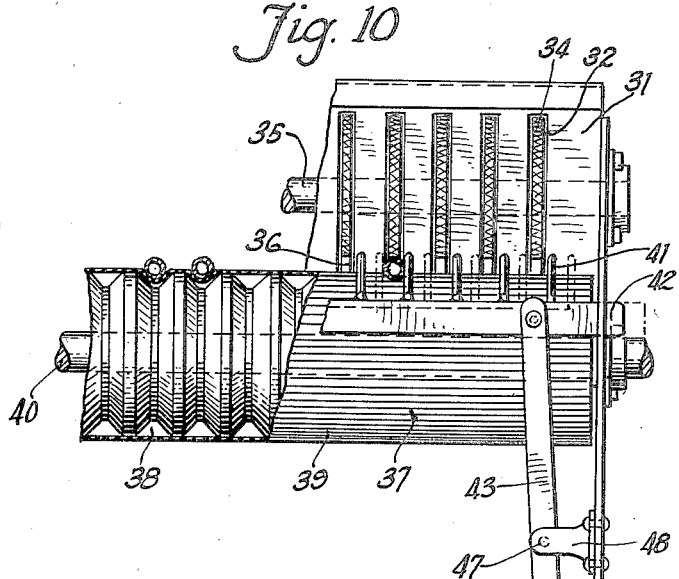
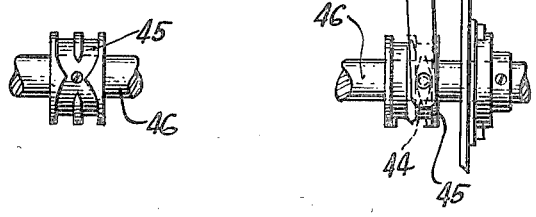
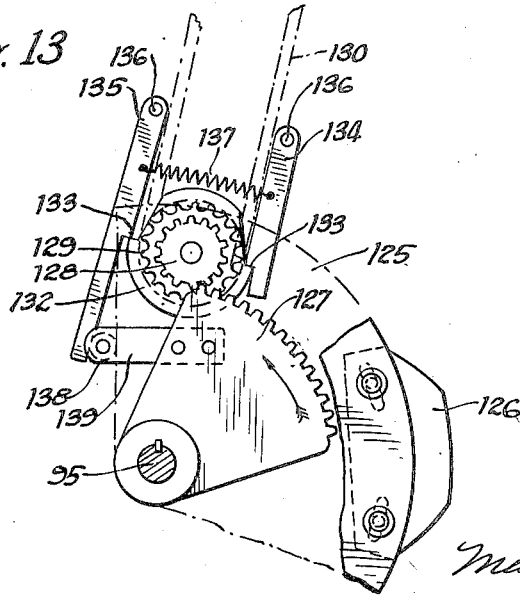
INVENTORS:
Charles R. Short
George E. Short
BY
Thiess Olson + Mecklenburger. Att'ys

United States Patent Office 2,694,832
Patented Nov. 23, 1954

2,694,832

DECORTICATING MACHINE AND METHOD OF TREATING FIBER FROM RAMIE AND SIMILAR FIBER-BEARING PLANTS

Charles R. Short and George E. Short, Clermont, Fla.

Application December 29, 1948, Serial No. 67,782

17 Claims. (Cl. 19—10)

The present invention relates to a machine and method for use in the treatment of ramie and similar fiber-bearing plants, and is a continuation in part of our co-pending application filed October 14, 1943, Serial No. 506,220. Subsequent to the filing of the present continuation in part, the earlier application Serial No. 506,220 was abandoned.

More particularly this invention relates to a decorticating machine for removing the outer fibrous portion of ramie and similar plants from the woody part of the stalk and the treatment of the stalks and fibers to produce a maximum amount of high grade ramie fiber.

The valuable properties of ramie fiber have long been known. It is not only stronger than any other known fiber, but is silk-like in appearance, readily takes dyes, and does not mildew, rot, or noticeably deteriorate with age. Moreover, unlike most fibers, it has an extremely high wet strength, so that instead of becoming weaker when wet, thread and other materials made from such fiber may even increase in strength.

Obviously, the uses of such fiber are practically unlimited. Despite the fact that the superlative quality of ramie fiber has long been known and the demand for it is insistent, efforts to produce the fiber commercially have consistently ended in failure and abandonment. With the present method and decorticating machine, the commercial production of ramie fiber may now be carried on successfully.

Ramie is a perennial grown in countries having a relatively warm climate. Certain parts of Florida have proved ideal for the plants. Growth is very rapid and the roots produce three or four crops a year. The ramie stalks may grow to about six feet or even more in height and up to one inch or more in diameter. Each stalk consists of a tubular, woody portion filled with pith and having a layer of fibers thereabout with a very thin coating of bark on the outside. It has been found that stalks of Florida ramie about one-half to three-fourths of an inch in diameter, with the bark partially matured to the extent that it has turned brown only part way up the stalks, are most suitable for decorticating and treatment. The stalks are stripped of leaves and after being topped and preferably made substantially uniform in length, for example five and a half feet, are then treated on the machine of the present invention.

It has heretofore been the practice, in the various efforts to produce ramie fiber, to cut the stalks and then transport the stalks to a mill for decortication. Thereafter the decorticated stalks, comprising over eighty per cent of the untreated stalks, had to be disposed of. Moreover, during decortication the fibers were frequently bruised, cut, and weakened, and woody portions of the stalks were not completely removed from the fiber.

The present decorticating machine is mobile and relatively light-weight, so that it may be taken directly to the fields where the ramie is grown, and used there to decorticate the stalks immediately after they are cut. In fact, when a harvesting machine is used to cut the stalks, the decorticating machine may be towed by the harvesting machine and the stalks cut by the harvester immediately supplied to the towed decorticating machine following along.

The present machine has a large capacity, being of sufficient width to treat a large number of stalks simultaneously. A receiving table is provided upon which the stalks may be piled and thereafter automatic feeding means at the proper intervals act to feed additional charges to the machine, thereby resulting in substantially continuous decortication of the stalks. In passing through the machine, the stalks are slit and opened up, then flattened, after which the fiber is separated from the woody portions of the stalk, and, after having the bark substantially removed therefrom, is discharged from the machine. At the same time the defibered stalks are simultaneously discharged as waste material. When the decorticating is carried on at the ramie fields, the waste material may be strewn upon the ground where it rapidly decomposes and refertilizes the soil, insuring heavy future growth of the plants.

It has been found that by decorticating the stalks immediately after they have been cut, the fiber may be more readily and cleanly removed from the stalks and the bark separated from the fiber. The degumming and subsequent treatment may also be milder, so the result is a maximum yield of high grade fiber.

An object of the present invention is to provide a relatively light-weight, mobile, decorticating machine that may be taken directly to the fields where the ramie or other fiber to be treated is grown and there used to remove the fiber from the stalks.

Another object of the present invention is to provide such a machine having sufficient capacity to simultaneously treat large numbers of stalks so as to be capable of substantial output.

Still another object of the present invention is to provide a decorticating machine having automatic feeding means which will automatically feed, at the proper intervals, cut stalks on the receiving table of the machine, thereby resulting in continuous decortication of the stalks.

A still further object is to provide a decorticating machine of the type above referred to which will cleanly remove substantially all the fiber from the woody portions of the stalks and remove most of the bark therefrom without cutting or harming the fibers.

A still further object is to provide such a decorticating machine which may be operated for extended periods of time with little care or attention.

Further objects and advantages will be apparent from the following description and claims when considered together with the accompanying drawings, in which:

Fig. 1 is a side elevational view of a decorticating machine embodying the present invention;

Fig. 2 is a side elevational view of the opposite side of the machine from that shown in Fig. 1;

Fig. 3 is a vertical, cross-sectional view through the machine shown in Figs. 1 and 2;

Fig. 4 is a top plan view of the decorticating machine with parts broken away;

Fig. 5 is an enlarged perspective view of a portion of ramie stalk;

Fig. 6 is an enlarged cross-sectional view of a portion of the machine shown in Fig. 3, with the breakoff table or bar in upper or raised position;

Fig. 7 is a partial vertical cross-sectional view of the construction shown in Fig. 6 with the breakoff table in changed position;

Fig. 8 is a front elevational view of some of the combined slitting and spreading members employed in the machine;

Fig. 9 is a side elevational view of the mechanism for controlling the operation of the breakoff table;

Fig. 10 is a partial, end, elevational view of the feeding discs and roll together with the stalk positioning mechanism of the machine;

Fig. 11 is a partial cross-sectional view of a stalk passing between a feeding disc and the roll shown in Fig. 10;

Fig. 12 is an elevational view of the cross-over cam for controlling the movement of the stalk positioning mechanism shown in Fig. 10; and Fig. 13 is a side elevational view of the gear segment, spur gear and associated parts for controlling the operation of the feeding discs shown in Fig. 10.

Referring to the drawings and more particularly to Figs. 1, 2, 3, and 4, there is shown a decorticating machine embodying the present invention comprising a frame 11 mounted on a pair of rear wheels 12 and a single front wheel 13. As shown, the frame may consist of side channel members 14 and 15 connected at the rear by a cross member 16. An axle 17, upon which the rear wheels 12 are mounted, is secured to the cross member 16. Extending between the front ends of the side members 14 and 15 are a pair of cross members 18 and 19. The front wheel 13 is mounted on the axle 21 extending between the arms of a bifurcated draft bar 20 which, in turn, is connected to the cross member 19 by a king pin 22 for pivotal movement thereabout. This permits the decorticator to be easily steered and moved about to any location desired.

Rigidly connected to the side channel members 14 and 15 are upwardly extending side frame members or plates 23 and 24 which support the various portions of the decorticating machine. Each of the side plates 23 and 24 is provided with a forwardly extending portion 25 adjacent the upper ends of the side plates forming the sides of what might be termed a receiving table, and rearwardly extending portions 25a adjacent the central portions of the side plates.

At the front end of the machine, a receiving table or portion is provided for receiving the cut stalks, and from which automatic feeding means may simultaneously feed a large number thereof to the rest of the machine. This portion comprises an outer roll 26 and an inner smaller roll 27 journalled in the side portions 25. Positioned between the rolls 26 and 27 and substantially parallel thereto is a supporting bar 28 having a plurality of spaced guide fingers 29 extending upwardly therefrom which separate the stalks into smaller groups. Inwardly of the smaller roller 27 there is a fixed table portion 30 also extending between the sides 25. Stalks of ramie or other fiber can be piled on the receiving portion just described the full width thereof, with the large or butt ends arranged as the leading ends. The rolls 26 and 27 are rotated in a direction tending to feed the stalks marked A into the machine.

The stalks are retained in the position shown in Figs. 3 and 4 until the next periodic actuation of the feeding mechanism when a plurality of stalks are simultaneously fed into the machine.

A vertically arranged back stop or barrier 31 extends between the top sides of the side plates 23 and 24. As shown particularly in Fig. 10, the back stop or barrier 31 is provided with downwardly-opening, spaced, vertical slots 32 in which are positioned an equal number of feeding discs 34 mounted on a shaft 35 journalled in the side plates 23 and 24. The slots 32 are each wide enough to permit a stalk to pass therethrough.

The feeding discs 34 are preferably provided with right-angled, peripheral, cut-out portions 36, and are so arranged that the cut-out portions are normally at the bottom, with the inner vertical edges thereof substantially opposite the back stop 31, as shown in Fig. 3. The size of the cut-out portions is sufficient to permit the butt ends of the stalks to fit thereinto. In normal position, the discs and back stop form a substantially solid barrier which prevents advance of the ramie stalks therebeyond despite the rotation of the rolls 26 and 27. The peripheries of the feeding discs are preferably knurled.

Immediately below and slightly forwardly of the discs 34 there is a feeding roll 37. This roll 37 may have spaced peripheral grooves 38 (Fig. 10) with a rubber sleeve 39, preferably having longitudinal corrugations thereon, positioned thereover. The discs 34 and roll 37 are so arranged that one of the grooves 38 is positioned directly under each of the discs 34. Thus, as the stalks are fed forwardly by the roll 37 and feeding discs 34, as hereinafter described, the stalks will be forced down into the grooves 38 in the general manner illustrated in Fig. 11. Suitable means are provided for continually rotating the feed roll 37 in a direction to feed the stalks into the machine and also for intermittently rotating the discs 34 also in a direction to feed the stalks into the machine. The shaft 40 of feed roll 37 is journalled in the opposite side plates of the machine.

The feeding means employed acts to simultaneously feed into the machine at predetermined intervals stalks equal in number to the feeding discs 34. To operate in this manner it is necessary that a stalk be positioned to fit into each of the cut-out portions 36 of the discs 34 prior to the beginning of each feeding operation. To insure that a set of stalks is thus positioned shifter fingers 41 mounted in spaced relation on a bar 42 are provided. The bar 42 is longer than the distance between the side plates 23 and 24 and the ends extend through slots provided in the plates, as shown in Fig. 10, thereby permitting longitudinal movement of the bar 42 transversely of the machine. The movement of the bar is such that, except for the end fingers, each of the fingers 41 will be positioned between two of the feeding discs 34 and will move substantially between the full and dotted line positions of Fig. 10. Accordingly, as the bar 42 is reciprocated the fingers 41 will alternately move the butt ends of the adjacent stalks into feeding position with respect to the feeding discs 34 on each side thereof.

A shifter bar lever 43 is pivotally connected to the bar 42 at its upper end and may be provided with a pin or cam roller 44 at its lower end for engaging the grooves of a cross-over cam 45 mounted on the main drive shaft 46 of the machine. The lever 43 is pivoted at 47 intermediate its ends to the fulcrum bracket 48 mounted on the side plate 24. Reciprocation of the bar 42 is timed with the rotation of the discs 34, so that the bar moves when the discs are stationary.

A fixed guide member 49 having pairs of converging walls 50 for guiding the butt ends of the stalks to the next pair of rolls in the machine is placed immediately in back of the feed roll 37 and discs 34. To the rear of the guide member 49 there is a second pair of feed rolls 51 and 52, with their centers slightly below the centers of the discs 34 and feed roll 37. The upper roll 51 (Fig. 4) is provided with spaced relatively shallow grooves aligned with each of the feeding discs 34. The lower roll 52 may be similar to roll 37 and is positioned with the grooves thereof directly below the grooves in the roll 51. The guide member 49 thereby insures that the stalks will be fed from the grooves in the roll 37 to the grooves in the next pair of rolls 51 and 52. The rolls 51 and 52 are provided with shafts 53 and 54, respectively, which are journalled in the opposite side plates 23 and 24.

A plurality of combined knife and spreader members 55 is mounted at the discharge side of rolls 51 and 52 on a transverse support 56. They are so positioned that one is directly behind every groove in the rolls 51 and 52. Each of the members 55 is formed with a sharp forward edge 55a which tapers downwardly and rearwardly, as shown in Fig. 6. It is also shaped somewhat as a double plowshare and broadens out from the sharp cutting edge to form a spreading portion 55b toward the rear thereof. With this construction, when the stalks are fed against the knives, the sharp, rearwardly-sloping, forward edge first cuts through the fiber and wood and into the pith. As the stalk moves rearwardly it is split longitudinally and the sides are separated and flattened until they lie substantially horizontally, as shown in Fig. 8. The knife is preferably positioned so that the lower edge does not cut through the bottom portion of the stalk, which, therefore, remains in one piece, as illustrated.

It has also been found important to have the front knife-edge taper rearwardly. If the knife edge is arranged vertically there is a tendency for the stalks to jam due to the fact that the fibers frequently are somewhat spirally arranged. Therefore, instead of the knife edge running parallel to the fibers, some of them will lie transversely of the knife edge and, being very tough, will build up and prevent the knives from cutting the stalks. However, by having the rearwardly-tapering cutting edge, this disadvantage is avoided and the tendency of the fiber to pile up on the knives is obviated.

To the rear of the members 55 there is arranged another pair of rolls 57 and 58 having shafts 59 and 60, respectively, journalled in the side plates. These rolls, which may suitably be provided with a hard, corrosion-resistant surface, such as stainless steel, serve to flatten the split stalks. All the rolls 37, 51, 52, 57, and 58 are driven by suitable means at the same speed. Accordingly, the stalks will be fed through the machine at a constant speed without strain to the fibers.

A narrow, transversely-arranged table 61 having its opposite ends supported between the side frame members 23 and 24 is at the rear of the flattening rolls 57 and 58. This table is positioned to receive the flattened stalks discharged from between the rolls 57 and 58. Adjacent the rear side of the table 61 there is a breakoff bar 62 extending substantially the full width of the machine. It may be substantially channel shaped as shown in Figs. 4, 6, and 7, with the flanges extending downwardly and the flat surface thereof facing upwardly. The space between the table and breakoff bar is sufficient to permit the passage therebetween of strips of fiber without any binding, scraping or cutting action.

The breakoff bar 62 may be supported between the outer ends of levers, such as bellcrank levers 63, mounted on stud shafts 64 adjacent the side plates 23 and 24 of the machine. The opposite ends of the bellcrank levers 63 are connected by links 65 to levers 66 fixed on a shaft 67 journalled in the side plates. Shaft 67 also has fixed thereto a downwardly extending arm 68. Rocking of the shaft 67 will cause the levers 63 to pivot about shaft 64 and move the breakoff bar 62 between its upper position shown in full lines in Fig. 6 and its lower position illustrated in Fig. 7. The shaft 64 is positioned forwardly of the bar 62. Thus, in moving from its upper to lower position the bar moves downwardly and somewhat rearwardly of the machine.

A roller 69 having a shaft 70 is positioned below the breakoff bar 62 with the ends of the shaft 70 journalled in the bellcranks 63. When the breakoff bar 62 and roller 69 are in raised position, as shown in Fig. 6, the flattened stalks discharged by the rolls 57 and 58 will engage the roll 69, which is rotated in the direction of the arrow, to deflect the stalks downwardly. In lower position the top of the breakoff bar 62 is horizontally aligned with the top of the table 61 and the periphery of the roller 69 is substantially in contact with the periphery of the roller 58. Both rollers preferably have the same peripheral speed and when adjacent each other serve as feed rolls.

In the machine illustrated the bellcrank levers 63 are adjacent the outer faces of the side plates 23 and 24. It is therefore necessary that the breakoff bar 62 and roll 69 supported by these bellcranks and movable substantially vertically extend through the side plates 23 and 24. Accordingly, to permit movement of the breakoff bar 62 and roller 69 the side plates are provided with openings 62a of sufficient size to permit such movement.

The operation of the machine is so synchronized that, as any load of stalks passes through the rolls 57 and 58, the breakoff bar 62 will be in raised position and the ends of the stalks will be directed downwardly by the rolls 69. Then, as soon as the leading ends of the stalks are directed downwardly by the roll 69, the breakoff bar 62 is moved to its lower position, thereby snapping off the leading tips of the respective stalks and initiating the separation of the strips of fiber from the rest of the stalks. The rolls 58 and 69 direct the strips of fiber downwardly for further treatment while permitting the stripped stalks to pass over the breakoff bar 62 and be discharged.

Below the rolls 58 and 69 there are a pair of rotary debarking members 71 and 72 in the form of rolls which also serve to remove the broken ends of the stalks from the fiber strips. The roll 71 may have a plurality of V-shaped members 73, such as longitudinally arranged angle irons, facing radially outwardly and evenly spaced about the periphery thereof. The roll 72 may be provided with a number of evenly spaced bars 74 extending longitudinally thereof substantially the full width of the machine, equal to twice the number of V-shaped members 73 mounted on the roll 71. The rolls 71 and 72 are arranged to rotate in opposite directions, as shown by the arrows in Figs. 6 and 7, with a bar 74 meshing with one of the V-shaped members 73 and the next bar 74 coming intermediate adjacent V-shaped members. The rolls 71 and 72 are rotated substantially faster than the speed of feed of the stalks through the machine. This results in the removal of the broken off stalk tips as well as a rubbing or mild scraping action of the fiber passing between these two members. The outer edges of the bar 74 are somewhat dulled or rounded and are also spaced from the cooperating V-shaped members 73 so that the fiber is not cut or injured thereby. As the bark is on the lower side of the fiber it will be acted upon by the longitudinal scraping members 74 and thereby substantially removed from the fiber. Rolls 71 and 72 are fixed on shafts 75 and 76, respectively, journalled in the side plates of the machine.

From the debarking members 71 and 72 the fiber passes between the endless belts 77 and 78 extending substantially the full width of the machine. The lower belt 77 passes over the front roll 79 mounted on shaft 80 and over rear roll 81 mounted on shaft 82. The shafts 80 and 82 are journalled in the side plates 23 and 24. The upper belt 78 passes over a front roll 83 having a shaft 84 and over a rear roll 85 mounted on shaft 86, these shafts likewise being journalled in the side plates. The rolls 79 and 83 are so positioned that the fiber strips are clamped between the belts and removed rearwardly thereby, being discharged over the outer belt 77. At the same time the defibered stalks after passing over the breakoff bar 62 enter the downwardly sloping discharge chutes 87.

The driving mechanism for the machine will now be described. In the particular embodiment illustrated, the decorticator is driven by a gasoline engine 90 mounted on a platform 91 supported by the cross members 18 and 19 of the frame. The drive wheel 92 of the engine 90 drives a sheave 94 loosely mounted on a camshaft 95 by a suitable belt 93. Fixedly connected to the sheave 94, and also freely mounted on the camshaft 95, is a small sprocket wheel 96 connected to a large sprocket wheel 97 fixed on the main drive shaft 46, by a sprocket chain 99. Also fixed on the main drive shaft 46 is a small sprocket wheel 100 which is connected to the sprocket wheel 101 fixed on the camshaft 95 by a sprocket chain 102. The sprocket wheel 101 may suitably be five times the size of the sprocket wheel 100, in which case the camshaft 95 will operate at one-fifth the R. P. M. of the main drive shaft 46.

As shown in Fig. 1, the main drive shaft 46 is provided on the end extending outwardly of the side plate 23 with a sprocket 103, and each of the shafts 40, 53, 54, 59, and 60 of the rolls 37, 51, 52, 57, and 58, respectively, is similarly provided with sprockets 104, 105, 106, 107, and 108. These various sprockets are driven from the sprocket 103 by means of the sprocket chain 109 passing thereover. The sprocket chain 109 is of double width and the sprockets 105 and 106 are arranged closely adjacent each other with their teeth overlapping, as are the sprockets 107 and 108, so that the chain 109 will engage the teeth of all of these sprockets as well as those of sprocket 104. The direction of rotation of the sprocket wheel 103 and the chain 109, is clockwise as viewed in Fig. 1, and drives the rolls 37, 51, 52, 57, and 58 in a direction to feed the stalks through the machine from left to right, as shown in Fig. 1, or right to left in Figs. 2 and 3.

The shaft 40 also has fixed thereon (Fig. 1) a sprocket 110 aligned with sprockets 111 and 112 splined to the shafts of the rolls 26 and 27 respectively. A sprocket chain 114 drives the sprockets 111 and 112 from the sprocket 110. This rotates the rolls 26 and 27 in a direction tending to feed into the machine the stalks placed thereon.

The drive for the debarking rolls 71 and 72 is also arranged on the same side of the machine. The shaft 59 of roll 57 is provided with a large sprocket wheel 115 outwardly of the sprocket wheel 107 and preferably secured thereto. The sprocket wheel 115, by means of a chain 116, drives a sprocket 117 mounted on an idler shaft 118. A second sprocket fixed to rotate with the sprocket 117 is also mounted on shaft 118 and drives sprocket 119 on shaft 75 of debarking roll 71 by a sprocket chain 120. The sprocket 115 is substantially larger than the sprockets 117 and 119 so that the speed of rotation of the sprocket 119 and the shaft 75 on which it is fixed is substantially greater than the speed of the shaft 59 and may be on the order of five times as great. A gear 121 on the shaft 75 meshes with a gear 122 on the shaft 76 of the debarking wheel 72. Thus the debarking members 71 and 72 are driven from the shaft 59 of roller 57 but at substantially greater speed.

The feeding discs 34 mounted on shaft 35 are driven from the camshaft 95. The end of the camshaft 95 projecting outwardly beyond the side plate 24 has fixed thereon a sector plate 125, such as is illustrated in Figs. 2 and 13. Adjustably secured on the sector plate 125 and extending outwardly beyond the periphery thereof is a cam 126, the sides of which slope outwardly from the periphery of the sector plate to the outer cam surface.

In the embodiment illustrated, the sector plate 125 is provided on its inner face with a gear segment 127 for meshing with a spur gear 128 fixed on a stud shaft journalled in the side plate 24. The teeth on the gear segment 127 and spur gear 128 are of equal number, so that movement of the gear segment past the gear 128 will result in one complete revolution of the gear 128. A sprocket 129 fixed to the gear 128 is connected by a chain 130 to a sprocket 131 fixed on the outer end of the shaft 35 of discs 34. Thus every rotation of the shaft 95 results in the gear segment 127 rotating gear 128 and the sprocket 129 one revoltuion, which results in one revolution of the discs 34. While the shaft 95 is rotating constantly, the discs 34 will only rotate a small portion of the time required for one rotation of shaft 95.

Locking means are provided to insure that the gear 128 and thereby the discs 34 make one complete revolution only, and then stop with the discs 34 in their rest positions illustrated in Figs. 6 and 10. For this purpose a locking plate 132 (Fig. 13) having cut-out portions on opposite sides thereof forming similarly facing shoulders 133 is also fixed with respect to the gear 128 and sprocket 129. Pawls 134 and 135 are pivoted by pins 136 positioned above the locking plate 132 to the side plate 24 in positions to engage the shoulders 133. A spring 137 urges the pawls against the locking plate to lock the plate in its normal inactive position, as shown in Fig. 2. When thus locked, the plate 132, sprocket 129 and gear 128 are held stationary. Before they can be rotated by the gear segment 127 the pawl 135 must be moved away from the adjacent shoulder 133. This can be accomplished by a pawl release member 138 mounted on a bar 139 projecting in advance of the gear segment 127. The pawl release member 138 is positioned to engage the lower end of pawl 135 and release the pawl from its shoulder 133 just prior to engagement of the gear segment 127 with the gear 128. Thereupon the gear 128 makes one complete revolution before the pawls 134 and 135 reengage the shoulders 133 of the locking plate and prevent further rotation thereof.

Although the gear 128 is only rotated during part of the revolution of the sector plate 125, it makes one revolution for every revolution of the camshaft 95. The discs 34 driven by the gear 128 also make one revolution for every revolution of the cam shaft 95 and preferably rotate at the same speed as the roll 37. If the relative speed of the main drive shaft 46 to the camshaft 95 is five to one, each of the rolls 37, 51, 52, 57, and 58 will make five revolutions for each revolution of the discs 34. Assuming that these various rollers are five inches in diameter, the periphery of each of these rolls 37, 51, 52, 57 and 58 will move through approximately 78½ inches for each revolution of the discs 34. In other words, assuming that a stalk is positioned with the butt end in the cut-out portion of a disc 34, this end will advance approximately 78½ inches before the butt end of the next stalk will start its movement through the machine. Accordingly, stalks 5½ to 6 feet long can be readily handled by a machine such as described, there being substantially continuous passage of the charges or groups of stalks through the machine at all times. With this construction the discs 34 and roll 37 simultaneously make one revolution to start a stalk or group of stalks through the machine. Thereafter the stalks are fed by the rolls 37, 51, 52, 57 and 58 which continue to rotate while the discs 34 are stationary. During this time the stalks are forced downwardly into the grooves in the roll 37, as shown in Fig. 6, and slide beneath the stationary discs 34.

As hereinbefore explained, the breakoff bar 62 is moved to its upper or lower position by rocking of the shaft 67 to which the lever 66 is fixed. Referring particularly to Figs. 2 and 9, the lever 66 may have secured to its outer face a cross arm 140 having downwardly extending bifurcated legs at each end in which rollers 141 and 142 are mounted for rotation. The cross member 140 and rollers 141 and 142 are so positioned on the lever 66 that in one position, shown in full lines in Fig. 9, the roller 141 will ride on the periphery of the sector plate 125 and the roller 142 will be spaced a distance therefrom substantially equal to the projection thereabove of the cam 126. In this full line position the breakoff bar 62 is in lower position.

However, when the roller 141 is moved upwardly by the cam 126 to the dotted line position shown in Fig. 9, shaft 67 will be rocked counterclockwise and the breakoff bar 62 will be raised to its upper position shown in dotted lines. The breakoff bar remains in its upper position a short time only, when the cam portion 126 will engage the cam roller 142 and rock the shaft 67 in the opposite direction, thereby rapidly lowering the breakoff bar 62 to its full line position.

The sector plate 125 and cam 126 are synchronized with the feeding discs 34 and the conveying and flattening rolls so that the cam 126 engages cam roller 141 shortly prior to the time that the butt ends of the stalks approach the breakoff bar 62. Thereupon the bar is raised, as above described, for a period of time long enough to permit the ends of the stalks to pass under the front edge of the breakoff bar. Then cam 126 engages cam roller 142 and causes the breakoff bar to be moved across the path of the stalks and break off a small piece of the butt end of each of the stalks. Such action starts the peeling of the fiber strips from the stalks.

During most of the time the sector plate 125 is rotating, it is desirable that the breakoff bar 62 be maintained in its lower position to permit the stalks from which the fiber has been peeled to pass thereover. Positive means for accomplishing this may comprise the downwardly extending arm 68 and a cam 143 mounted on the camshaft 95. As shown in Figs. 3, 6 and 9, the cam 143 is circular with a relatively large notch 144 in one side thereof. For the major portion of rotation of the cam 143, the periphery thereof engages the arm 68 maintaining the arm to the left (Figs. 3 and 9), this being its position when the breakoff bar 62 is in lower position. However, when the notch 144 is facing the arm 68, the arm may move toward the right, with the end thereof extending into the end of the notch, as shown in Fig. 6. In this position the breakoff bar 62 is in upper position.

The cam 143 is so arranged on the camshaft 95 that the periphery of the cam 143 engages the arm 68 until just before cam 126 engages cam roller 141, at which time the notch 144 is facing the arm 68. Consequently, when the cam 126 raises the cam roller 141, arm 68 can move to the dotted position shown in Fig. 9, where it may remain until cam 126 moves cam roller 142 upwardly and returns the breakoff arm 62 to lower position. At this point the periphery of the cam 143 reengages the arm 68, thereby maintaining the breakoff bar in lower position until the notch 144 again faces the arm 68.

Power means are provided for constantly rotating the roll 69 supported below the breakoff bar 62. A sprocket 145 secured on the end of shaft 53 of roll 51 drives a sprocket 146 on one of the stud shafts 64 by a sprocket chain 147 (Fig. 2). A second sprocket on the stud shaft 64 fixed to rotate with the sprocket 146 is connected to a sprocket 148 secured on the shaft 70 of roll 69. The size of the sprockets for driving roll 70 is preferably such as to result in roll 70 having the same peripheral speed as roll 58.

The endless belts 77 and 78 may be driven from the flattening roll 58. A large sprocket 149 (Fig. 2) is fixed on the shaft 60 of this roll and drives a spracket 150 on shaft 84 of roll 83, sprocket 151 on shaft 82 of roller 81 and sprocket 152 on the shaft 80 of roller 79. This is accomplished by a sprocket chain 153 which runs from the sprocket 149 beneath the sprocket 150, about the sprocket 151, and then back underneath the sprocket 152 to the driving sprocket 149 again. The drive just described causes the endless belts 77 and 78 to be driven at relatively high speeds in the direction of the arrows shown on Fig. 3.

It is therefore to be seen that the motor 90 drives the camshaft 95 and main drive shaft 46 from which all the other parts of the machine are driven directly or indirectly as hereinabove described. The driving means and most of the rolls are preferably covered by guards or covers.

In the operation of the machine, piles of stalks with their butt ends all facing toward the machine may be placed on the roll 26, supporting bar 28, and table 30, the fingers 29 tending to divide the stalks into separate groups. The roller 27 will guide to the table 30 the ends of any stalks not originally supported by the table.

Due to the rotation of roller 26, the stalks are all urged against the barrier 31 and the vertically extending faces 36 of the cut-out portions of discs 34. As the drive shaft 46 rotates, the fingers 41 are moved back and forth, but are arranged to be stationary at the time that the discs 34 are rotated. The fingers 41, as shown in Figs. 4 and 10, position the butt ends of the stalks in or facing the cut-out portions of the discs 34. The lower roller 37, positioned beneath the disc 54, also is constantly rotating and tends to feed the stalks into the machine.

As soon as the discs 34 are rotated, the butt ends of the stalks are fed by these discs and the roller 37 into the machine and between the converging walls 50 of the guide member 49 which directs them into grooves in the feed rollers 51 and 52. As each group of stalks is fed into the machine only a single stalk passes through each of the slots 32 in the barrier 31, the remaining stalks of each group being continually urged against the barrier by the rolls 26 and 27. The butt ends of the stalks, after passing beyond the rollers 51 and 52, are forced against the sloping cutting edges 55a of the knife member 55 and are spread by the rear portions 55b thereof so that they lie substantially horizontally with the pith and woody portions uppermost and the bark and fiber portions on the underside. The stalks are then passed between the rolls 57 and 58 where they are flattened, this flattening, however, being insufficient to harm or deteriorate the fibers in any way. The flattened stalks pass over the narrow table 61 at which time the breakoff bar 62 is in upper position, having been raised shortly before the butt ends of the stalks passed over this table. When the ends of the stalks project a short distance beyond the table 61 they engage the roller 69 and are directed downwardly toward the debarking rolls 71 and 72. Thereupon, the breakoff bar 62, which is synchronized with the feeding discs 34 and conveying rolls, is moved downwardly and breaks off the front ends of the stalks. This starts the peeling of the fibers from the stalks.

With the breakoff bar 62 in lower position the ribbons of fiber with the short pieces of stalk on their front ends are fed by the rolls 69 and 58 downwardly until they are engaged by the debarking members 71 and 72 rotating at speeds substantially above those of the conveying rolls of the machine. This results in a flexing of the fiber ribbons and a wearing away of the bark without harming the fibers, as the debarking members 71 and 72 do not have any sharp cutting edges. In fact, these rolls, or the scraping members 73 and 74 thereon, are preferably adjustable to permit their being properly set at all times to avoid injury to the fibers. From the debarking rolls 71 and 72 the fiber ribbons are fed between the endless belts 77 and 78, being discharged at the rear end of the machine by the belt 77.

The stalks which pass over the breakoff bar 62 are directed by the guides 87 to opposite sides of the machine.

The machine of the present invention is mobile and may be taken directly to the fiber fields, and, if desired, be towed behind the cutting or harvesting machine. The stalks immediately after being cut may be piled on the receiving portion of the decorticating machine the full width thereof. Thereafter, at timed intervals, a plurality of substantially parallelly-arranged stalks will be fed into the machine by the discs 34. The stalks are preferably of substantially the same length, as the production of the machine is greatest when treating such material.

As soon as the rear ends of one charge of stalks advance a short distance beyond the discs 34, the next charge is automatically fed to the machine, and the ribbons of fiber, cleanly removed from the rest of the stalks and free of woody particles, are continuously discharged by the conveyor 77 while the waste material is discharged at the sides of the machine.

Through the use of the present machine the fiber may be removed from the stalks immediately after the stalks are cut, when there is the least adherence of the fiber to the woody portions of the stalks. The only material transported from the fields are fiber ribbons which are only a small percentage of the total yield of the ramie or other fiber.

The fiber may thereafter be quickly degummed by a short cook in a mild solution, such as a one per cent caustic solution. When the fiber is treated shortly after the stalks have been cut, it is not even necessary to use high temperatures. Heating in such a solution for an hour or even less at 180° F. will remove the gum from the fibers. This is because the gums are substantially water-soluble when the stalks are cut. However, they become increasingly water-insoluble as the fiber stands and moisture evaporates therefrom. After the degumming step it is only necessary to wash the fibers, dry them, and then preferably comb them. The resulting fibers are of maximum length and maximum strength, being uninjured by any treatment. Instead of being brown, harsh, and coarse, the fibers resulting from the present treatment are substantially white, soft, and fine.

While we have described a particular machine and method embodying the present invention, it will be understood that we do not wish to be limited thereto, since many modifications may be made, and we therefore contemplate by the appended claims to cover any such modifications as fall within the true spirit and scope of our invention.

We claim:

1. A machine of the character described comprising in combination feeding mechanism including a plurality of individual feeding discs, each of said discs having a peripheral cut-out portion of sufficient size to receive therein the end of a stalk, operating mechanism for intermittently and simultaneously rotating said individual discs, conveying mechanism for conveying said stalks through the machine, means for longitudinally slitting and spreading said stalks, a breakoff member for being moved substantially across the path of said stalks to break said stalks for separating the fiber therefrom, and actuating mechanism synchronized with said feeding and said conveying mechanisms for moving said breakoff member to break said stalks when the leading ends of said stalks are opposite said breakoff member.

2. A machine of the character described comprising in combination feeding mechanism including a plurality of spaced discs mounted for rotation, each of said discs having a similarly arranged peripheral cut-out portion for receiving therein the end of the stalk, operating mechanism for intermittently and simultaneously rotating said discs, a barrier arranged between said discs, conveying mechanism for conveying said stalks through the machine, means for longitudinally slitting and spreading said stalks, a breakoff member for being moved substantially across the path of said stalks to break said stalks for separating the fiber therefrom, and actuating mechanism synchronized with said feeding and conveying mechanisms for moving said breakoff member to break said stalks when the leading ends of said stalks are opposite said breakoff member.

3. A machine of the character described comprising in combination feeding mechanism including a plurality of spaced discs mounted for rotation, each of said discs having a similarly arranged peripheral cut-out portion for receiving therein the end of the stalk, operating mechanism for intermittently and simultaneously rotating said discs, a barrier arranged between said discs, a supporting structure for receiving fibrous stalks having means for positioning a plurality of stalks with the ends thereof adjacent said discs in position to be fed into the machine, conveying mechanism for conveying said stalks through the machine, means for longitudinally slitting and spreading said stalks, a breakoff member for being moved substantially across the path of said stalks to break said stalks for separating the fiber therefrom, and actuating mechanism synchronized with said feeding and conveying mechanisms for moving said breakoff member to break said stalks when the leading ends of said stalks are opposite said breakoff member.

4. A machine of the character described comprising in combination feeding mechanism including a plurality of spaced individual feeding discs, each of said discs having a peripheral cut-out portion of sufficient size to receive therein the end of a stalk and a lower feeding roll having peripheral grooves positioned below each of said feeding discs for cooperating therewith, means for rotating said roll, operating mechanism for simultaneously and intermittently rotating said individual discs, conveying mechanism for conveying said stalks through the machine, means for longitudinally slitting and spreading said stalks, a breakoff member for being moved substantially across the path of said stalks to break said stalks for separating the fiber therefrom, and actuating mechanism synchronized with said feeding and conveying mechanisms for moving said breakoff member to break said stalks when the leading ends of said stalks are opposite said breakoff member.

5. A machine of the character described comprising in combination feeding mechanism including a plurality of spaced individual feeding discs, each of said discs having a peripheral cut-out portion of sufficient size to receive therein the end of a stalk and a lower feeding roll having resilient peripheral grooves positioned below said feeding discs for cooperating therewith, means for rotating said roll, operating mechanism for simultaneously and intermittently rotating said individual discs, conveying mechanism for conveying said stalks through the machine, means for longitudinally slitting and spreading said stalks, a breakoff member for being moved substantially across the path of said stalks to break said stalks for separating the fiber therefrom, and actuating mechanism synchronized with said feeding and conveying mechanisms for moving said breakoff member to break said stalks when the leading ends of said stalks are opposite said breakoff member.

6. A machine of the character described comprising in combination feeding mechanism for simultaneously feeding to said machine a number of substantially parallel stalks of ramie or similar fiber-bearing plants, means for intermittently actuating said feeding mechanism, means for longitudinally slitting and spreading said stalks, a pair of vertically aligned flattening rolls for receiving said stalks therebetween, a support for receiving the stalks from said flattening rolls, a breakoff member for being positioned adjacent the rear side of said support and moved above the path of said stalks and then substantially thereacross to break said stalks for separating the fiber therefrom, a roll positioned beneath said breakoff member, said roll cooperating with the lower flattening roll for feeding fiber therebetween when said breakoff member is in lower position, and actuating mechanism synchronized with said feeding mechanism for raising said breakoff member when the leading ends of the stalks are approaching it and moving said breakoff member across said path when the leading ends of said stalks pass thereunder.

7. A machine of the character described comprising in combination feeding mechanism for simultaneously feeding to said machine a number of substantially parallel stalks of ramie or similar fiber-bearing plants, means for intermittently actuating said feeding mechanism, conveying mechanism for conveying said stalks through the machine, means for longitudinally slitting and spreading said stalks, a support for said slit stalks, a breakoff member for being positioned adjacent said support and moved above the path of said stalks and then substantially downwardly thereacross to break said stalks for separating the fiber therefrom, actuating mechanism synchronized with said feeding and conveying mechanisms for raising said breakoff member when the leading ends of the stalks are approaching it and moving said breakoff member across said path when the leading ends of said stalks pass thereunder, and positive acting means normally maintaining said breakoff member in lower position.

8. A machine of the character described comprising in combination feeding mechanism for simultaneously feeding to said machine a number of substantially parallel stalks of ramie or similar fiber-bearing plants, means for intermittently actuating said feeding mechanism, conveying mechanism for conveying said stalks through the machine, means for longitudinally slitting and spreading said stalks, a support for said slit stalks, a breakoff member for being positioned adjacent said support and moved above the path of said stalks and then substantially downwardly thereacross to break said stalks for separating the fiber therefrom, actuating mechanism synchronized with said feeding and conveying mechanisms for raising said breakoff member when the leading ends of the stalks are approaching it and moving said breakoff member across said path when the leading ends of said stalks pass thereunder, and cam means normally acting to maintain said breakoff member in lower position.

9. A machine of the charcter described comprising in combination feeding mechanism for simultaneously feeding to said machine a number of substantially parallel stalks of ramie or similar fiber-bearing plants, means for intermittently actuating said feeding mechanism, conveying mechanism for conveying said stalks through the machine, means for longitudinally slitting and spreading said stalks, a support for said slit stalks, a breakoff member for being positioned adjacent said support and moved above the path of said stalks and then substantially downwardly thereacross to break said stalks for separating the fiber therefrom, actuating mechanism synchronized with said feeding and conveying mechanisms for raising said breakoff member when the leading ends of the stalks are approaching it and moving said breakoff member across said path when the leading ends of said stalks pass thereunder, and cam means synchronized with said feeding mechanism for maintaining said breakoff member in lower position substantially when said actuating mechanism is not operating to move said breakoff member.

10. A machine of the character described, comprising in combination a support for receiving thereon stalks of ramie or similar fiber bearing plants arranged generally longtudinally of said machine, means tending to advance said stalks into said machine, means arranged transversely of said machine normally preventing advance of said stalks including spaced intermittently operated feeding means, said means when operated acting to feed simultaneously to said machine a plurality of spaced substantially parallel stalks with their leading ends substantially aligned, means for intermittently actuating said feeding mechanism, means for longitudinally slitting and spreading said stalks, a breakoff member for being moved substantially across the path of said stalks to break said stalks for separating the fiber therefrom, and actuating mechanism synchronized with said feeding mechanism for moving said breakoff member to break said stalks when the leading ends of said stalks are opposite said breakoff member.

11. A machine of the character described, comprising in combination a support for receiving thereon stalks of ramie or similar fiber bearing plants arranged generally longitudinally of said machine, means tending to advance said stalks into said machine, means arranged transversely of said machine normally preventing advance of said stalks including spaced intermittently operated feeding discs, said discs when operated acting to feed simultaneously to said machine a plurality of substantially parallel stalks with their leading ends substantially aligned, means for intermittently actuating said feeding mechanism, means for longitudinaly slitting and spreading said stalks, a breakoff member for being moved substantially across the path of said stalks to break said stalks for separating the fiber therefrom, and actuating mechanism synchronized with said feeding mechanism for moving said breakoff member to break said stalks when the leading ends of said stalks are opposite said breakoff member.

12. A machine of the character described, comprising in combination a suport for receiving thereon stalks of ramie or similar fiber bearing plants arranged generally longitudinally of said machine, means tending to advance said stalks into said machine, means arranged transversely of said machine normally preventing advance of said stalks including spaced intermittently operated feeding means, said means when operated acting to feed simultaneously to said machine a plurality of spaced substantially parallel stalks with their leading ends substantially aligned, means for intermittently actuating said feeding mechanism, conveying mechanism for conveying said stalks through the machine, means for longitudinally slitting and spreading said stalks, a support for said slit stalks, a breakoff member for being positioned adjacent said support and moved above the path of said stalks and then substantially downwardly thereacross to break said stalks for separating the fiber therefrom, and actuating mechanism synchronized with said feeding and conveying mechanisms for raising said breakoff member when the leading ends of the stalks are approaching it and moving said breaking member across said path when the leading ends of said stalks pass thereunder.

13. A machine of the character described comprising in combination a support for receiving thereon stalks of ramie or similar fiber bearing plants arranged generally longitudinally of said machine, means tending to advance said stalks into said machine, means arranged transversely of said machine normally preventing advance of said stalks including spaced intermittently operated feeding members, said feeding members when operated acting to feed simultaneously to said machine a plurality of substantially parallel stalks with their leading ends substantially aligned, operating mechanism for intermittently and simultaneuosly operating said individual feeding members, conveying mechanism for conveying said stalks through the machine, means for longitudinally slitting and spreading said stalks, a breakoff member for being moved substantially across the path of said stalks to break said stalks for separating the fiber therefrom, and actuating mechanism synchronized with said feeding and conveying mechanisms for moving said breakoff member to break said stalks when the leading ends of said stalks are opposite said breakoff member.

14. A machine of the character described, comprising in combination feeding mechanism including a plurality of individual members for feeding single stalks to said machine, operating mechanism for intermittently and simultaneously operating said individual feeding members, conveying mechanism for conveying said stalks through the machine, means for longitudinally slitting and spreading said stalks, a breakoff member normally positioned at one side of the path of said stalks and reciprocable between its normal position and the opposite side of said path to break said stalks for separating the fiber therefrom, actuating mechanism for reciprocating said breakoff member to break said stalks, said actuating mechanism being synchronized with said feeding and conveying means to move said breakoff member from its normal position across the path of said stalks before the leading ends of said stalks reach said breakoff member and to return said member across said path to normal position when the leading ends of said stalks are adjacent thereto, to break off the leading ends of said stalks.

15. A machine of the character described, comprising in combination feeding mechanism including a plurality of individual members for feeding single stalks to said machine, operating mechanism for intermittently and simultaneously operating said individual feeding members, conveying mechanism for conveying said stalks through the machine, means for longitudinally slitting and spreading said stalks, a breakoff member normally positioned below the path of said stalks and movable across said path to break said stalks and separate the fiber therefrom, actuating mechanism for raising and lowering said breakoff member, said actuating mechanism being synchronized with said feeding and conveying means to raise said breakoff member above said path before the leading ends of said stalks reach said member and to move said member downwardly when the leading ends of said stalks are thereunder to break off the leading ends of said stalks.

16. In a machine of the character described having rotating feeding means for engaging one side of stalks to be fed into said machine, a roller member for cooperating with said feeding means to feed said stalks, said roller member having spaced circumferential grooves of a cross-sectional size to receive a stalk therein, and a tubular cover of resilient material for said roller member to permit said stalks to be forced into said grooves while passing between said feeding means and said roller member.

17. In a machine of the character described, having a plurality of spaced feeding members, for engaging one side of stalks to be fed into said machine, a roller member for cooperating with said feeding members to feed said stalks, said roller member having spaced circumferential grooves beneath said feeding members of a cross-sectional size to receive a stalk therein, and a tubular cover of resilient material for said roller member to permit said stalks to be forced into said grooves while passing between said feeding members and said roller member.

References Cited in the file of this patent

UNITED STATES PATENTS

| Number | Name | Date |
|---|---|---|
| 388,665 | Green | Aug. 28, 1888 |
| 635,345 | Packer | Oct. 24, 1899 |
| 722,556 | Belding | Mar. 10, 1903 |
| 881,489 | Roeder | Mar. 10, 1908 |
| 1,598,094 | Lowry | Aug. 31, 1926 |
| 1,797,763 | Einstein | Mar. 24, 1931 |